United States Patent [19]

Nilsen

[11] 4,436,979

[45] Mar. 13, 1984

[54] APPARATUS FOR CONTINUOUS LASER WELDING

[75] Inventor: Carl J. Nilsen, Hopatcong, N.J.

[73] Assignee: SWS, Incorporated, Landing, N.J.

[21] Appl. No.: 375,586

[22] Filed: May 6, 1982

[51] Int. Cl.³ .............................................. B23K 27/00
[52] U.S. Cl. ...................... 219/121 LC; 219/121 LY; 219/160
[58] Field of Search ................. 219/121 LC, 121 LD, 219/121 LY, 121 EC, 121 ED, 121 L, 121 LM

[56] References Cited

U.S. PATENT DOCUMENTS

| 3,612,814 | 10/1971 | Houldcroft | 219/121 LV X |
|---|---|---|---|
| 3,834,010 | 9/1974 | Wolfe et al. | 228/15 |
| 4,000,392 | 12/1976 | Banas et al. | 219/121 LM |
| 4,152,572 | 5/1979 | Saurin et al. | 219/121 L |
| 4,207,453 | 6/1980 | Astill | 219/160 X |
| 4,272,004 | 6/1981 | Nilsen | 228/17.5 |
| 4,315,132 | 2/1982 | Sourin et al. | 219/121 LD |
| 4,354,090 | 10/1982 | Nilsen | 219/121 LC |

Primary Examiner—C. L. Albritton
Attorney, Agent, or Firm—Antonelli, Terry & Wands

[57] ABSTRACT

An apparatus for continuous laser welding adjacent longitudinally extending of generally tubular shaped members is disclosed. The apparatus comprises a Z-bar guide for positioning and guiding the edges as they are moved toward a welding area with a laser welding device for welding the edges, and a mandrel connected to the Z-bar guide and extending internally and in the direction of movement of the members. The mandrel includes a laser beam dump positioned adjacent the welding area for absorbing light from a laser beam produced by the laser welding device and at least one roller for internally supporting and guiding the generally tubular shaped members.

25 Claims, 6 Drawing Figures

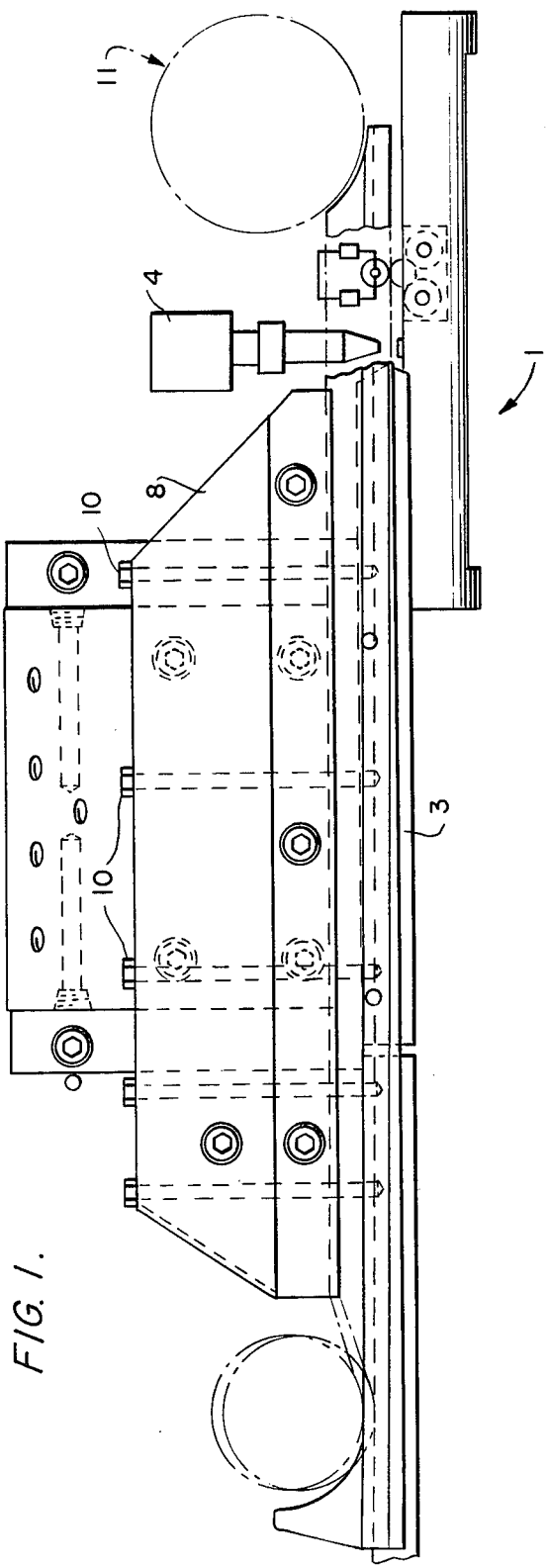
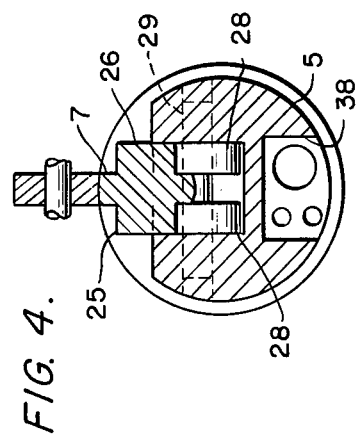
FIG. 1.
FIG. 4.

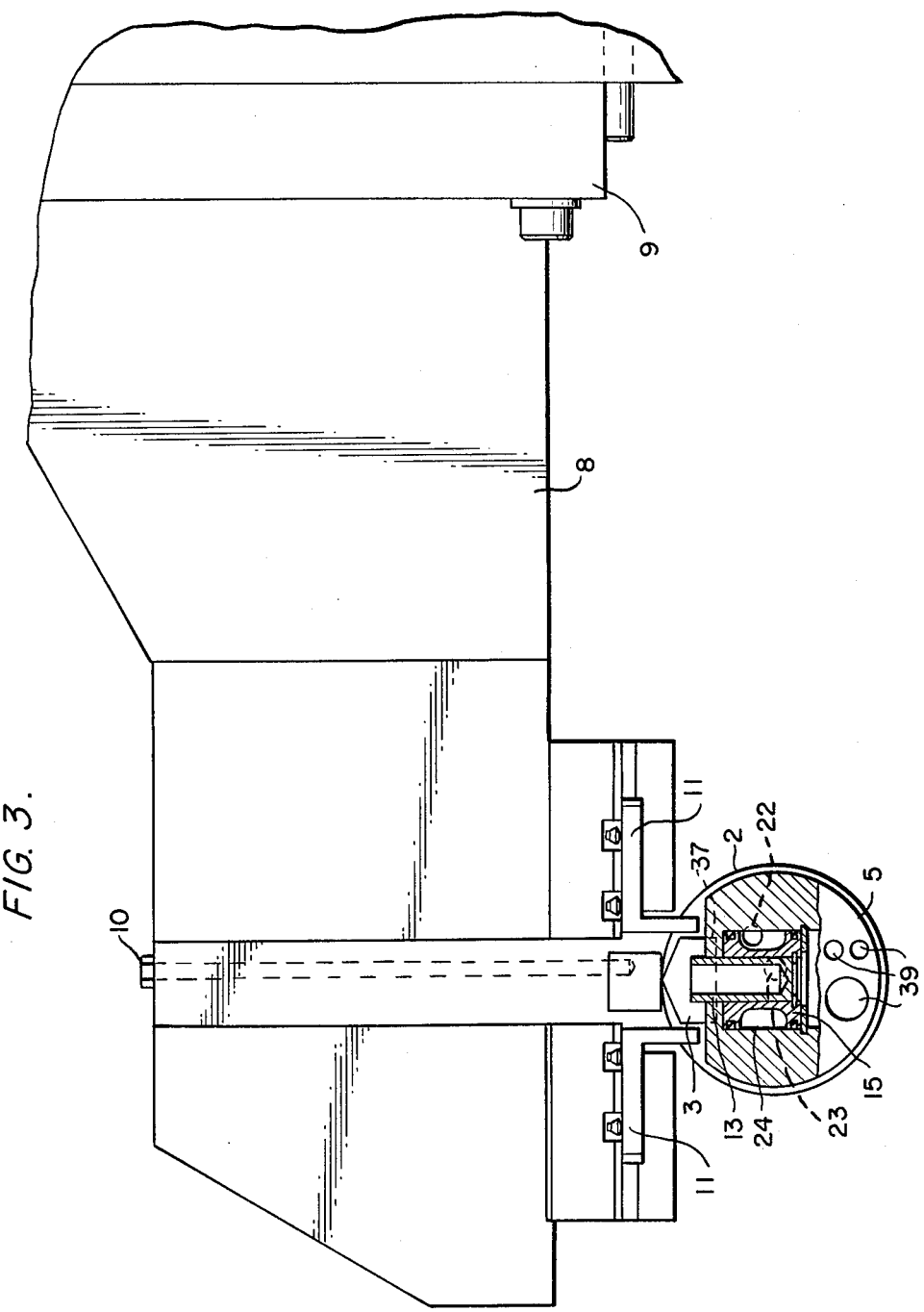

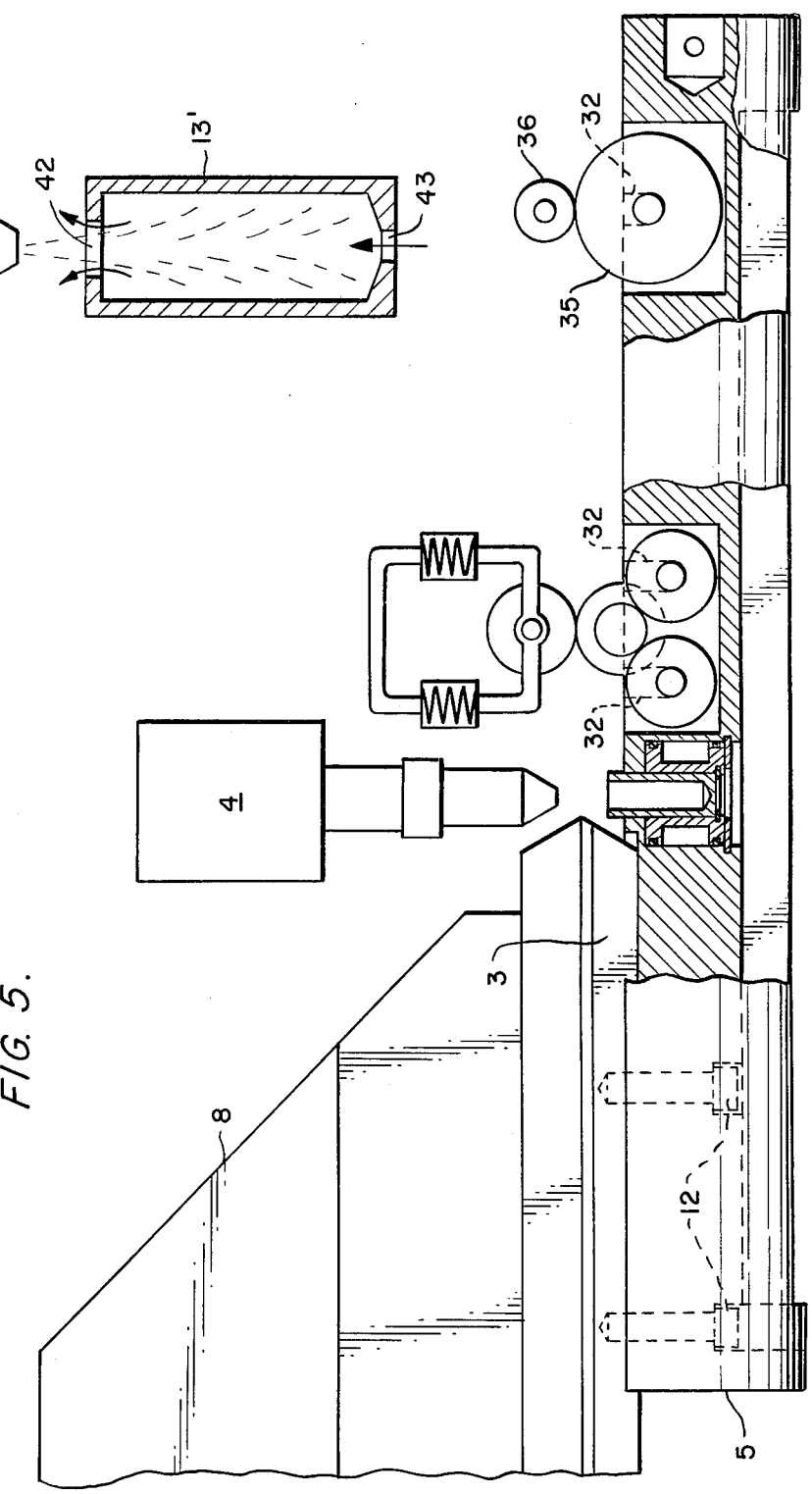

APPARATUS FOR CONTINUOUS LASER WELDING

CROSS-REFERENCES TO RELATED INVENTIONS

Reference is made to applicant's prior copending U.S. application Ser. No. 233,251 filed Feb. 10, 1981, now U.S. Pat. No. 4,345,090 issued Oct. 12, 1982, entitled Z-Bar Guide Apparatus and Method of Butt Welding which is a continuation-in-part application of applicant's earlier U.S. application Ser. No. 88,197, now U.S. Pat. No. 4,272,004 issued June 9, 1981 entitled Z-Bar Guide Apparatus. The disclosures of these patents are incorporated herein by reference.

BACKGROUND AND SUMMARY OF THE INVENTION

The present invention relates to an apparatus for continuous laser welding of adjacent longitudinally extending edges of generally tubular shaped members such as can bodies and the like which are moved relative to a laser welding device for welding the edges. More particularly, the invention relates to a mandrel for continuous laser welding of such members so that the potential damage to the members during welding is minimized while the quality and appearance of the weld are enhanced.

The applicability of laser welding for joining adjacent longitudinally extending edges of generally tubular shaped members is known. For example, in U.S. Pat. No. 4,152,573 to Saurin, et al., a method and apparatus for laser welding metal can bodies are disclosed. However, such an apparatus is not suitable for the type of continuous, high-speed operation necessary for production in most commercial applications. In particular, in Saurin, et al. the generally tubular shaped members are each fixedly clamped on both sides of the weld joint area by clamping bars of a vise or fixture. During welding the vise or fixture and the member clamped therein are advanced relative to a laser welding device to accomplish the welding. Thus, with such known apparatus an individual member to be welded must be first clamped, then welded, and thereafter unclamped from the vise or fixture before a second member can be processed. Such an apparatus is not suitable for commercial applications where continuous, high rates of production, such as 400–600 can bodies per minute, are necessary or desirable.

The Z-bar guide apparatus disclosed in applicant's aforementioned U.S. Pat. Nos. 4,272,004 and 4,354,090 make it possible to position and guide adjacent longitudinally extending edges of members so that the members may be continuously advanced and laser welded with a lap or butt joint. To accomplish this a means for advancing the members along the Z-bar and past the welding station must be provided. As indicated in the aforesaid patent and copending application, conventional chain type conveyors, drive rollers, reciprocating pistons or push rods or the like may be used to advance the members. Such an arrangement permits the continuous, high-speed laser welding of the adjacent longitudinally extending edges of the members. However, applicant has found that when laser welding such members, operator safety may be impaired and/or damage may occur to the members outside the weld area as a result of light from the laser beam which has passed through the weld joint, such as where the laser beam keyholes through the adjacent edges during welding. In the case of a metal tubular member being laser welded, light passing through the weld joint area can strike the opposite side of the tubular member and damage the member and/or a protective coating which has been applied thereto.

Another problem that may occur during the continuous laser welding of members with a Z-bar guide apparatus of the aforementioned type relates to the welding of the trailing ends of the members. That is, as the longitudinally extending edges of the members are advanced through the Z-bar and past the laser welding station and ultimately leave the Z-bar, they are no longer positioned and guided by the Z-bar and may become misaligned with respect to the Z-bar. If this occurs the trailing edges being welded may be moved or shifted so as to adversely affect the weld quality, particularly in the case where the trailing ends of the members leave the Z-bar before they are actually welded by the laser beam.

It has also been found that as a result of laser welding of adjacent longitudinally extending edges of the members, a slight weld upset may project outwardly from the surface of the members. Such a weld upset may be undesirable in the finished product from the standpoint of function and/or appearance.

An object of the present invention is to provide an apparatus for continuous laser welding adjacent longitudinally extending edges of generally tubular shaped members which minimizes or avoids the aforementioned problems which may occur in continuous, high-speed laser welding. More particularly, an object of the present invention is to provide an apparatus for continuous laser welding which enhances operator safety and prevents damage to the welded member outside the weld area by light and/or weld debris from the laser beam.

A further object of the present invention is to provide an apparatus for continuous laser welding adjacent longitudinally extending edges of generally tubular shaped members such as can bodies and the like, which supports and guides the members as they leave the Z-bar so that they do not become misaligned with respect to the Z-bar and adversely effect the weld at the trailing ends of the members.

An additional object of the invention is to provide an apparatus for continuous laser welding adjacent longitudinally extending edges of generally tubular shaped members which enables the weld upset on the members to be smoothed in a continuous manner following the laser welding operation.

These and other objects of the invention are attained by providing an apparatus for continuous laser welding adjacent longitudinally extending edges of generally tubular shaped members comprising Z-bar guide means for positioning and guiding the edges as the members are moved toward a welding area with a laser welding means for welding the edges, and a mandrel connected to the Z-bar guide means and extending internally and in the direction of movement of the members, the mandrel including laser beam dump means positioned adjacent the welding area for absorbing light from a laser beam produced by the laser welding means. With such an arrangement the light from the laser beam which passes through the weld joint area is absorbed for operator safety from reflected light and so that damage to the tubular shaped members and any coatings thereon is avoided.

According to a disclosed, preferred embodiment of the invention the laser beam dump means includes receptacle means for receiving light from the laser beam. The receptacle means is provided with an opening through which the light can enter and the inside of the receptacle means is a dark color for absorbing the light. In particular, the receptacle means in this disclosed embodiment is in the form of a cup which is made of an aluminum alloy. The inside of the cup is anodized black to absorb the light.

As another feature of the invention the receptacle means includes gas inlet means for receiving a gas so that the gas can pass through the receptacle means and out the opening therein to provide a gas, such as an inert shielding gas, in the welding area adjacent the edges being welded. In the disclosed embodiment the receptacle means is removably positioned within a cooling jacket for cooling the receptacle.

The mandrel of the invention further includes roller means for internally supporting and guiding the generally tubular shaped members as they leave the Z-bar. The roller means is located in the mandrel downstream of the laser dump means in the direction of movement of the members and includes a first roller which preferably contacts the members in the area of the weld. Such an arrangement prevents the tubular members from becoming misaligned as they leave the Z-bar to ensure that the trailing ends of the members are properly aligned during welding.

The first roller of the roller means in the mandrel includes support shaft portions extending from opposite sides of the first roller. These support shaft portions are supported on respective pairs of rollers provided on the mandrel. In the disclosed embodiment the respective pairs of rollers are bearings and the support shaft portions of the first roller are supported on the outer races of the bearings. Means are provided for removably mounting the plurality of rollers on the mandrel so that they may be readily repaired or replaced when necessary. According to one form of the invention the means for removably mounting the plurality of rollers includes slots formed in the mandrel which receive shafts upon which the plurality of rollers are mounted. According to another form of the invention the means for removably mounting includes holes extending through the mandrel for receiving shafts upon which the plurality of rollers are mounted.

An additional feature of the invention involves the provision of a second roller in a position for engaging the members in the area of the welded edges on a side of the members opposite the first roller of the roller means. According to one form of the invention means are provided for yieldably biasing the second roller in the direction of the members and the first roller to subject the members to a predetermined force. This arrangement permits the weld upset to be reduced and smoothed.

These and other objects, features and advantages of the present invention will become more apparent from the following description when taken in connection with the accompanying drawings which show, for purposes of illustration only, one preferred embodiment in accordance with the invention.

BRIEF DESCRIPTION OF THE DRAWINGS

FIG. 1 is a front side view of an apparatus for continuous laser welding adjacent longitudinally extending edges of generally tubular shaped members according to the invention;

FIG. 3 is an end view, partially in cross section, of the apparatus of FIG. 2 taken along the line III—III;

FIG. 4 is a cross sectional view of the apparatus of FIG. 2 taken along the line IV-IV;

FIG. 5 is a front side view of a mandrel as in FIG. 2 provided with an additional roller near its right end for guiding and supporting tubular members and wherein slots are provided in the mandrel for receiving the support shafts of the rollers; and FIG. 6 is a cross sectional view of another form of the cup for the laser beam dump of the invention wherein a gas inlet is provided in the cup so that gas may be delivered through the cup to the welding area.

DETAILED DESCRIPTION OF THE INVENTION

Figure 2:
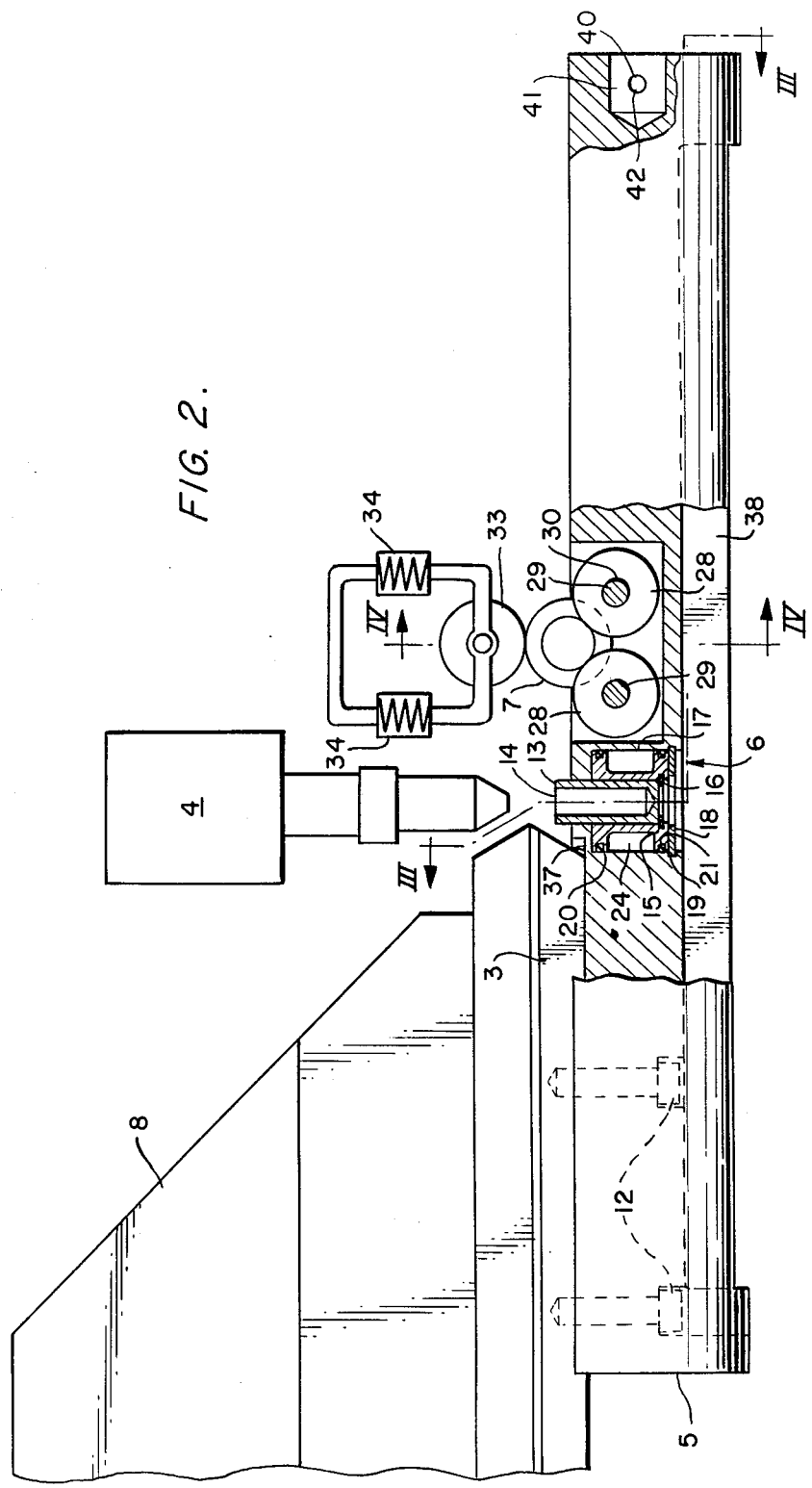
FIG. 2 is a front side view, partially in cross section, of the mandrel and a portion of the Z-bar guide to which the mandrel is connected as shown in FIG. 1.

Referring now to the drawings, the apparatus 1 of the disclosed embodiment for continuous laser welding adjacent longitudinally extending edges of generally tubular shaped members 2 comprises a Z-bar guide 3 for positioning and guiding the edges of the members as they are moved toward a welding area with a laser welding device 4 for welding the edges. A mandrel 5 is connected to the Z-bar guide and extends internally and in the direction of movement of the members. The mandrel 5 includes a laser beam dump 6 positioned adjacent the welding area for absorbing light from a laser beam produced by the laser welding device 4. As illustrated in FIGS. 1, 2 and 4, the mandrel 5 further includes a roller 7 located downstream of the laser beam dump 6 in the direction of movement of the members for internally supporting and guiding the members as they leave the Z-bar.

The Z-bar guide apparatus 3 positions and guides the adjacent longitudinally extending edges of the generally tubular shaped members 2 into overlapping or abutting relationship for welding at the welding area by the laser welding device 4. Such a Z-bar guide is disclosed in applicant's U.S. Pat. No. 4,272,004 and in applicant's copending U.S. application Ser. No. 233,251. The Z-bar guide 3 in the disclosed embodiment is supported from a Z-bar support assembly 8 by means of bolts 10 which extend into the upper portion of the Z-bar guide. The support assembly 8 is mounted on a tooling plate 9 of the apparatus.

The generally tubular shaped members 2, whose edges are to be welded are advanced along the Z-bar guide 3 by means of a conveyor mechanism schematically shown at 11 in FIG. 3. A conventional chain type conveyor, for example, may be used. Similarly, an additional conventional conveyor mechanism, not shown, is used to advance the generally tubular shaped members 2 from the laser welding device after the members have been welded.

The mandrel 5 is supported at one end from the trailing portion of the Z-bar guide 3 by means of connecting bolts 12 as illustrated in FIG. 2. The trailing portion of the mandrel 5 extends beyond the end of the Z-bar guide in cantilever fashion. In this position the mandrel 5 extends internally and in the direction of movement of the members 2 as the members are advanced through the Z-bar guide 3 and the laser welding device 4.

The laser beam dump 6 in the mandrel 5 is positioned immediately below the laser welding device 4 for absorbing light from a laser beam produced by the laser welding device, a 2 Kw gas laser, for example. The laser beam dump includes a receptacle 13 in the form of a cup for receiving the light. The cup is provided with an opening 14 through which the light can enter. The inside of the cup is colored a dark color, preferably black, for absorbing the light. According to a preferred form of the invention the cup is formed of an aluminum alloy with the inside of the cup being anodized black. The cup could also be formed of other materials such as copper, for example.

The receptacle 13 is cylindrical in shape and is removably positioned by means of a slide fit within a central opening in a cooling jacket 15 in the form of a spool positioned within the mandrel. The receptacle is supported within the spool on a snap ring 16 which is received in a groove in the wall of the cylindrical central opening of the spool. The spool closely surrounds the receptacle for good heat conductivity. Preferably, a thermal grease is provided between the receptacle 13 and the cooling jacket to increase the efficiency of the cooling. The spool is preferably formed of copper for good heat conductivity and high reflectivity and is cylindrical in shape for positioning within a cylindrical hole 17 formed in the mandrel. The spool is supported in position in the hole 17 by means of a snap ring 18 located in a groove 19 in the wall of cylindrical hole 17 as illustrated in FIG. 2. An annular coolant passage 24 is formed around the outer circumference of the spool. A coolant such as water is continuously supplied to the passage 24 by means of inlet and outlet passages 22 and 23 which extend from the leading end of the mandrel to the passage 24 as illustrated in FIGS. 2 and 3. 0-ring sealing members 20 and 21 on opposite sides of the passage 24 effectively seal the spool in the cylindrical hole 17 to contain the coolant. According to another form of the invention, the cooling jacket 15 can be brazed in the hole 17.

The roller 7 for internally supporting and guiding the tubular shaped members 2 preferably contacts the members in the area of the weld. The supporting surface of the roller 7 is preferably shaped to follow the contour of the tubular member being welded. In the disclosed embodiment cylindrical tubular members are being welded and the surface of the roller 7 is convex. If a square tubular member were being welded, for example, the roller may have a flat surface or even a slightly convex surface. The roller 7 is supported by support shaft portions 25 and 26 which extend from opposite sides of the roller as illustrated in FIG. 4. These support shaft portions may be formed integrally with the roller or as a separate shaft upon which the roller 7 is rotatably mounted. The support shaft portions 25 and 26 are, in turn, each supported on a pair of rollers 28 provided on the mandrel 5. In the disclosed embodiment the rollers 28 are ball bearings mounted on shafts 29 removably secured within openings 30 in the mandrel. The support shaft portions 25 and 26 of the roller 7 are supported on the outer races of these bearings. The rollers 28 and roller 7 are rotatably positioned within a recess 31 formed in the upper portion of the mandrel. Instead of ball bearings, the rollers 28 could also be bushings or roller bearings so long as they present a cylindrical, rotatably mounted surface.

The roller 7 merely rests upon the outer races of the ball bearings 28 and therefore can be readily removed for repair or replacement. Removal of the ball bearings 28 is accomplished by sliding the shafts 29 for the bearings out of the openings 30 in the mandrel. In another form of the invention illustrated in FIG. 5, the shafts 29 for the bearings 28 are received within slots 32 extending from the upper surface of the mandrel. With such an arrangement the bearings can be simply dropped into position or lifted out of position for repair or replacement.

A second roller 33 is provided for engaging the members 2 in the area of the weld on the outside of the tubular members, opposite the first roller 7. The second roller 33 can be supported on the tooling plate 9 of the apparatus, for example, by way of springs 34 which yieldably bias the roller 33 in the direction of the members 2 and the first roller 7 thereby subjecting the members to a predetermined force. This force may be selected so that the second roller 33 merely provides further support and guidance for the tubular shaped members or, the force may be sufficient to deform or flatten any weld upset that may occur. Alternatively, roller 7 and ball bearings 28 in the mandrel could be yieldably biased outwardly by a suitable spring arrangement with the second roller 33 being rotatably mounted in a stationary position. The surface of the roller 33 contacting the members 7 may be flat, concave, or even convex but is preferably selected to follow the contour of the outer surface of the members over at least a portion of its width.

In the form of the invention illustrated in FIG. 5, an additional roller 35 is provided on the mandrel downstream of the roller 7 for providing additional support and guidance to stabilize a long part such as a continuous tube or relatively long can body being welded. A roller 36 supported from the tooling plate 9 is positioned opposite the additional roller 35 for engaging the outside of the members 2 in the weld area.

The mandrel 5 of the invention is preferably formed from a corrosion resistant metal such as stainless steel or a nonferrous material such as an aluminum alloy. Where the rollers of the mandrel are merely used to support and guide the members 2, the mandrel may be formed of aluminum. Stainless steel is preferred because of its higher strength where the rollers of the mandrel are also used to smooth and flatten weld upset. The mandrel 5 has a cross section as shown in FIG. 3 which corresponds approximately to that of the tubular member being welded. In particular, the mandrel is circular in cross section with the upper portion of the mandrel being truncated or flat and having a central, elongated recess or cut-out 37 for receiving the bottom of the Z-bar guide 3. A recess or cut-out 38 is also provided in the lower portion of the mandrel 5 between the ends thereof for accommodating lines, such as electrical lines, conduits for air under pressure, coating materials, etc. extending downstream from the leading end of the mandrel. Each end of the mandrel 5 is formed with holes 40 therein which permit ingress and egress of such lines from the recess 38. A blind hole 41 is also formed in the downstream end of the mandrel for accommodating one end of a universal joint for attaching downstream apparatus to the mandrel 5 for coating the insides of the members 2, for example, subsequent to the welding operation. The connection to the mandrel 5 and the blind hole 41 is by way of a dowel pin 42 provided in an appropriate hole formed in the mandrel.

During operation of the apparatus of the invention, the generally tubular shaped members 2 are successively advanced through the Z-bar guide 3 and past the laser welding device 4 by the conveyor mechanism 11. As the adjacent longitudinally extending edges of the members 2 are welded by the laser welding device 4, the laser beam dump 6 in the mandrel 5 absorbs light from the laser beam which passes through the weld joint area during welding and between adjacent, spaced apart members thereby effectively preventing damage to the members 2 and any coatings therein. The roller 7 internally supports and guides the members 2 downstream of the laser welding device 4 in combination with a plurality of calibrating hourglass-shaped rollers, not shown, provided about the outside of the tubular members. By locating the roller 7 immediately downstream of the laser welding device 4 and laser beam dump 6, the members 2 continue to be accurately supported and guided even after the edges thereof leave the Z-bar guide 3. This effectively reduces or prevents misalignment problems during welding, especially during the welding of the trailing ends of the members 2. The roller 7 of the mandrel, together with the second roller 33, also permits the reduction of any weld upset which may occur during the laser welding so that the welded surface of the members 2 are smoothed.

Another form of the receptacle or cup 13' for the laser beam dump 6 of the invention is illustrated in FIG. 6 of the drawings. In this form of the invention the cup 13' serves not only as a laser beam dump but also as a gas manifold for distributing gas to the weld area. In particular, the cup 13' is formed with a gas inlet 43 in the bottom thereof. Gas may be delivered to the inlet 43 by a suitable line extending through a hole 40, recess 38 and the central aperture of snap ring 16. The opening in the top of the receptacle 13' for receiving the light of the laser beam is reduced in width in this form of the invention. Gas received through the inlet 43 passes through the receptacle 13' and exits from the opening 42 in the direction of the underside of the edges being welded. An inert shielding gas, for example, may be applied to the weld area in this manner.

While I have shown and described only one embodiment in accordance with the present invention, it is understood that the same is not limited thereto, but is susceptible to numerous changes and modifications as known to those skilled in the art. For example, the roller 7 and/or second roller 33 may be used to emboss the welded member for a decorative effect or to improve the surface of the members for a subsequent finishing operation such as coating. Further, the apparatus of the invention can be used to continuously laser weld the edges of non-tubular members, such as the adjacent edges of flat members whose edges are guided in the respective grooves of the Z-bar guide. The laser beam dumps of the invention could also be used as electrodes in arc augmented laser welding of the type described in U.S. Pat. No. 4,167,662 to Steen. An electrical connection to the beam dumps is provided in such an application by, for example, an electrical conductor, not shown, which extends through mandrel hole 40 and recess 38 to outside of the cup 13 or 13' to which it is connected by a suitable fastener. Therefore, I do not wish to be limited to the details shown and described herein, but intend to cover all such changes and modifications as are encompassed by the scope of the appended claims.

I claim:

1. Apparatus for continuous laser welding adjacent longitudinally extending edges of generally tubular shaped members comprising Z-bar guide means for positioning and guiding said edges as the members are moved toward a welding area with a laser welding means for welding said edges, and a mandrel connected to said Z-bar guide means and extending internally and in the direction of movement of said members, said mandrel including laser beam dump means positioned adjacent said welding area for absorbing light from a laser beam produced by said laser welding means.

2. Apparatus according to claim 1 wherein said laser beam dump means includes receptacle means for receiving said light, said receptacle means having an opening through which said light can enter, the inside of said receptacle means being dark colored for absorbing said light.

3. Apparatus according to claim 2, wherein said receptacle means is formed of an aluminum alloy, the inside of said receptacle means being anodized black.

4. Apparatus according to claim 2, wherein said receptacle means is formed of copper.

5. Apparatus according to claim 2, wherein said receptacle means includes gas inlet means for receiving a gas so that said gas can pass through receptacle means and out said opening to provide gas in the welding area adjacent said edges being welded.

6. Apparatus according to claim 2, wherein means are provided for cooling said receptacle.

7. Apparatus according to claim 6, wherein said means for cooling includes a cooling jacket located closely about said receptacle means.

8. Apparatus according to claim 7, wherein said receptacle means is removably positioned within said cooling jacket.

9. Apparatus according to claim 1, wherein said mandrel further includes roller means for internally supporting and guiding the generally tubular shaped members.

10. Apparatus according to claim 9 wherein said roller means is located downstream of said laser beam dump means in the direction of movement of said members.

11. Apparatus according to claim 10, wherein said roller means includes a first roller which contacts the members in the area of the weld.

12. Apparatus according to claim 11, wherein said first roller is supported by support shaft portions which extend from opposite sides of said first roller, each of said support shaft portions in turn being supported on a plurality of rollers provided on said mandrel.

13. Apparatus according to claim 12, wherein said plurality of rollers are bearings, said support shaft portions being supported on the outer races of said bearings.

14. Apparatus according to claim 12, wherein means are provided for removably mounting said plurality of rollers on said mandrel.

15. Apparatus according to claim 14, wherein said means for removably mounting includes slots which receive shafts upon which said plurality of rollers are mounted.

16. Apparatus according to claim 14, wherein said means for removably mounting includes holes extending through said mandrel for receiving shafts upon which said plurality of rollers are mounted.

17. Apparatus according to claim 11, wherein a second roller is provided in position for engaging said members in the area of the welded edges on a side of said members opposite said first roller.

18. Apparatus according to claim 17, wherein means are provided for yieldably biasing said second roller in the direction of said members and said first roller of the mandrel to subject said members to a predetermined force.

19. Apparatus according to claim 10, wherein said mandrel further includes additional roller means located downstream of said roller means for providing additional support and guidance for said member.

20. Apparatus according to claim 1, wherein said mandrel is formed of stainless steel.

21. Apparatus according to claim 1, wherein said mandrel is formed of a nonferrous material.

22. Apparatus according to claim 1, wherein said mandrel includes passage means for accommodating lines extending to additional apparatus located downstream of said mandrel.

23. Apparatus according to claim 1, wherein said mandrel includes means on its downstream end for connecting additional apparatus to said mandrel.

24. Apparatus for continuous laser welding of adjacent longitudinally edges of members which are moved relative to a laser welding means for welding said edges comprising a mandrel adapted to be positioned adjacent the members in the welding area during laser welding, said mandrel including laser beam dump means for absorbing light from a laser beam produced by said laser welding means and roller means for supporting and guiding the members.

25. Apparatus according to claim 1 or 24, wherein said laser beam dump means includes electrical connection means whereby said laser beam dump means can be employed as an electrode for arc augmented laser welding of said members.

* * * * *